Aug. 27, 1940.    D. M. LIGHT    2,212,814
SNUBBER
Filed July 5, 1938    2 Sheets-Sheet 1
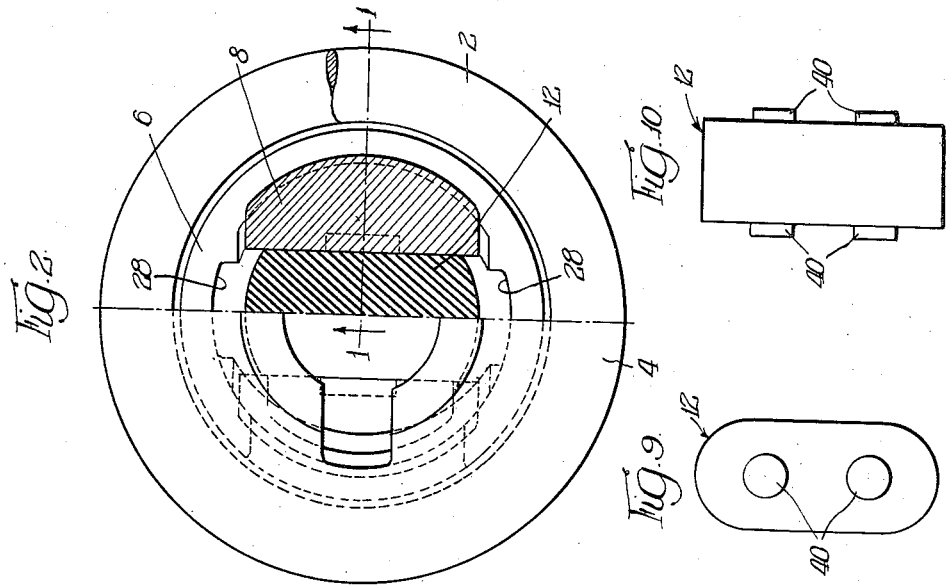
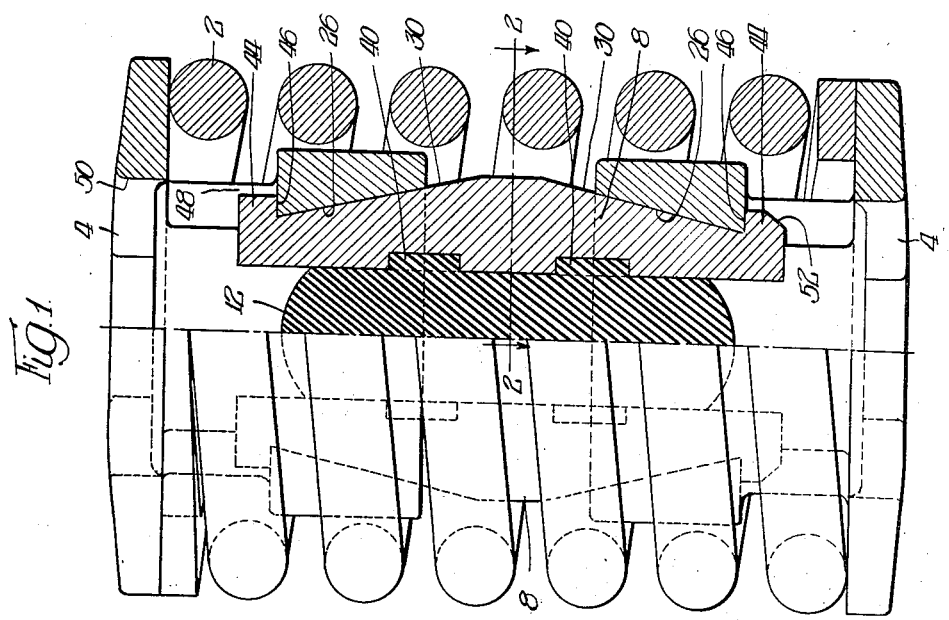
INVENTOR.
David M Light,
BY
ATTORNEY.

Aug. 27, 1940.                D. M. LIGHT                 2,212,814
                               SNUBBER
                          Filed July 5, 1938            2 Sheets-Sheet 2
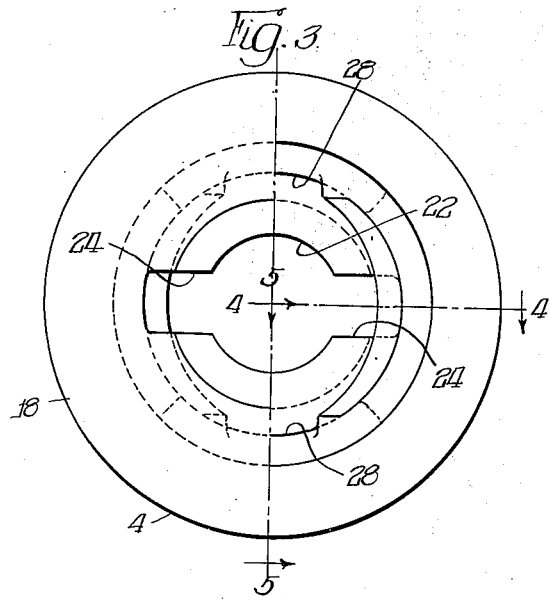
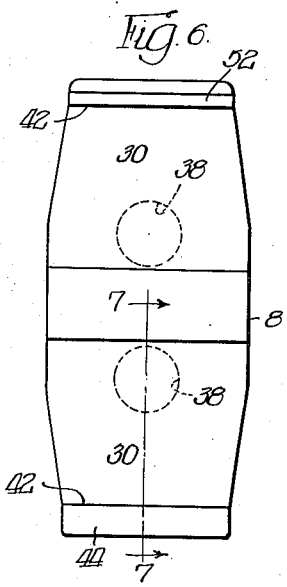
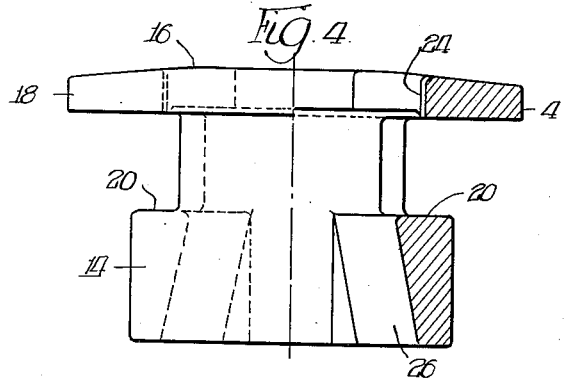
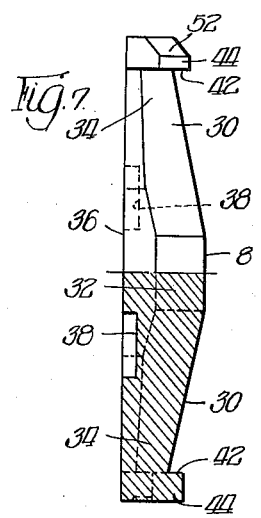
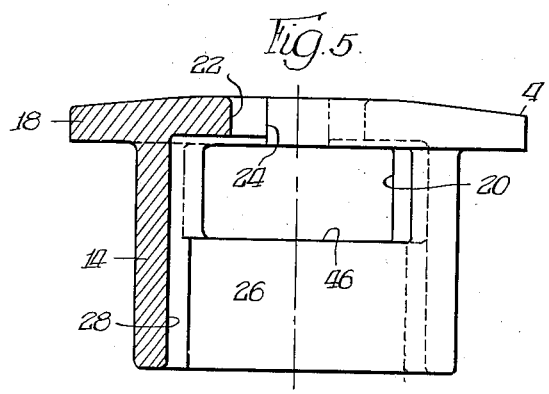
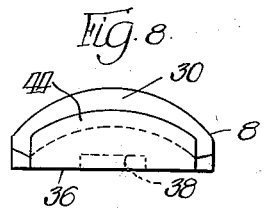
INVENTOR.
David M. Light,
BY
ATTORNEY.

Patented Aug. 27, 1940

2,212,814

UNITED STATES PATENT OFFICE 2,212,814

SNUBBER

David M. Light, Chicago, Ill., assignor to American Steel Foundries, Chicago, Ill., a corporation of New Jersey Application July 5, 1938, Serial No. 217,370

20 Claims. (Cl. 267—9)

My invention relates to a friction absorbing device and more particularly to a compact snubbing arrangement suitable for use in a railway car truck.

In the modification shown, my novel snubber is designed to replace a single coil spring having inner and outer coils, but it will readily be recognized that other embodiments might have other dimensions suitable for use under other conditions.

It is well recognized that many of the snubbers used in the place of the single coil spring function sufficiently for only a relatively short period of time. This is due to the fact that it is not easy to arrange wearing parts capable of producing the required amount of frictional absorption in so small a space. Where frictional absorption is produced a certain amount of wear must take place. If wear is to take place it must be so designed as to provide a sufficient quantity of metal to be worn away as will permit the friction absorbing device to have such a length of life as will make it an efficient device in actual use.

Many of the difficulties heretofore encountered in developing an efficient friction absorbing device suitable to replace a single coil in railway service have been due to the fact that the resilient means employed necessarily occupy so great a portion of the space that the friction means themselves are reduced to relatively small size. The result is that, after a comparatively short period of use, such devices become inefficient and have relatively little friction absorbing capacity.

A general object of my invention is to produce a friction absorbing device which may be embodied in a form suitable for use in the space generally assigned to a single coil spring in railway service while, at the same time, overcoming the difficulties above referred to.

A more specific object of my invention is to design a novel form of snubbing or friction absorbing arrangement wherein relatively few parts will be used of comparatively simple form, thus reducing to a minimum the manufacturing costs. The simplicity of form presented by my novel arrangement also permits the use of relatively large masses of metal at the areas of frictional engagement, thus permitting an exceptionally long life for the device.

A further object of my invention is a friction absorbing device of novel form having a minimum number of parts, certain of said parts being duplicated, thereby reducing to a minimum the cost of production while, at the same time, meeting the requirements of operation.

More specifically, my novel snubbing arrangement consists of identical top and bottom followers and a pair of friction shoes, also identical, said parts being housed in a single coil spring with additional resilient means interposed between said friction shoes.

Describing my novel friction absorbing device in more detail,

Figure 1 is an elevation view, half in section, of one embodiment thereof, the section being taken in the plane bisecting the device longitudinally and substantially as indicated by the line 1—1 of Figure 2;

Figure 2 is a top plan view, half in section, the section being taken in a plane bisecting the device in a horizontal plane and substantially as indicated by the line 2—2 of Figure 1;

Figures 3, 4 and 5 show the form of the top and bottom spring caps, Figure 3 showing a plan view thereof, the left half of said figure showing the top plan and the right half thereof the bottom plan; Figure 4 is an elevational view of the spring cap, half in section, the section being taken in a plane bisecting the spring cap and substantially as indicated by the line 4—4 of Figure 3; and Figure 5 is an elevation view, half in section, the elevation being ninety degrees from the elevational view of Figure 4 and the section being in a plane bisecting the spring cap substantially in the plane indicated by the line 5—5 of Figure 3;

Figures 6, 7 and 8 show the friction shoe used in my novel snubbing device wherein Figure 6 is a plan view thereof; Figure 7 is a side elevation, half in section, the section being taken in a plane bisecting the shoe longitudinally and substantially as indicated by the line 7—7 of Figure 6; and Figure 8 is an end elevation thereof;

Figure 9 is a plan view of the resilient means or snubber spring used in my novel snubbing arrangement; and Figure 10 is a side elevation thereof.

It will be observed that my snubbing device comprises the outer coil spring 2, the top and bottom spring caps or end followers 4, 4, identical in form, and the friction shoes 8, 8 also alike in form, between which is interposed my novel form of compression spring 12.

The form of the followers or spring caps is shown in detail in Figures 3, 4 and 5 wherein it may be observed that the follower has a body portion 14 of regular cylindrical form on its outer face, said body portion being integrally joined to the substantially flat circular plate-like end portion 16, said end portion forming seating means at each end of the snubber. The perimeter of the end portion 16 is defined by the annular flange 18 which extends radially outwardly of the body portion 14, a distance substantially equal to or slightly greater than the diameter of the wire used in the coil spring 2. It may be noted that the outer face of the end portion 16 is somewhat arcuate in form as best seen in Figures 4 and 5, thus permitting the device to accommodate itself to side movements or lateral motion of the truck parts. Adjacent the juncture of the cylindrical body portion 16 are formed the horizontal slots or openings 20 serving as abutments for the reception of means for interlocking the followers with the side wedges as more particularly described hereafter. In the plate-like end portion 16 is formed the central circular opening 22 having the slots 24, 24 at diametrically opposed sides thereof and in alignment with the before mentioned horizontal slots 20 for a purpose to be hereafter explained.

The inner circumference of the cylindrical body portion 14 is of irregular form with the opposed friction surfaces 26, 26 aligned respectively with the before mentioned slots 20, 20 at the opposite sides of said cylindrical body portion. Each of the friction surfaces 26, 26 is of regular cylindrical form, but diagonally arranged with respect to the axis of the device as best seen from a consideration of Figures 1 and 4. The said friction faces 26 are spaced apart and between their adjacent edges are formed the vertical channels 28, 28 (Figure 3) defined by shoulders at their lateral edges, said shoulders also forming positioning means or abutments for the lateral edges of the friction shoes therebetween, thus preventing their rotation within the cylindrical portion of the follower against which they are seated. The said vertical channels 28, 28 also serve to provide additional clearance for the sides of the rubber spring 12 when it is in maximum compression. The diagonal arrangement of the cylindrical friction surfaces 26, 26 permits the most efficient form of engagement with the complementary surfaces 30, 30 formed on the outer faces of the friction shoes.

The form and detail of the friction shoes 8, 8 are shown in Figures 6, 7 and 8. It may be noted that the friction shoe is an elongated substantially flat body of metal relatively thick at the central portion as indicated at 32 and tapering symmetrically therefrom toward the relatively thin end portions 34, 34. The inner face of the friction shoe is a flat surface as best seen at 36 (Figure 7), said flat surface serving as a seat for the side of the rubber spring 12 with the recesses 38, 38 designed to receive the side lugs 40, 40 (Figure 10) acting as positioning means for the rubber spring. On the inner face of the friction shoe are formed the cylindrical friction surfaces 30, 30 complementary in form to the before mentioned cylindrical friction surfaces 26, 26 on the end followers or spring caps and designed to seat thereagainst. At the opposite ends of the friction shoe are formed the shoulders 42, 42 defined by the annular flanges 44, 44, said shoulders being designed to abut the inner edges 46, 46 (Figure 5) of the slots 20, 20 formed in the respective end followers. In the assembly view of Figure 1 it will be observed that the flanges 44 are received within the openings 20 in the end followers and that the shoulders at the inner edges of said flanges abut with the inner edges of the openings 20 as already described.

The rubber compression spring is shown in Figures 9 and 10. It comprises a solid block of special composition rubber of generally rectangular cross section with the positioning means 40, 40 on the lateral face thereof. The shape of the block is shown from a consideration of the plan view of Figure 9 and the elevational view of Figure 10.

Assembling the parts, the compression rubber spring 12 is positioned between the friction shoes 8, 8, the proper relationship thereto being assured by seating the positioning means 40, 40 in the recesses 38, 38, after which the said parts are placed in a machine designed to compress the rubber between the friction shoes to an extent sufficient to permit one end thereof to be positioned in an end follower. Thereafter, the coil spring is assembled around the parts already mentioned and the parts are placed in a machine designed to again compress the rubber 12 between the friction shoes a sufficient amount to permit the reception of the ends of the friction shoes, as assembled, between the opposed friction surfaces of the other end follower after which pressure is applied to the last mentioned end follower, thus forcing the friction shoes within the last mentioned end follower until the flanges 44 snap into position in the slots 20, 20.

In dismantling the device, a convenient tool receivable in the slot 24 may be inserted behind the flange 44 as indicated at 48 and fulcrumed against the edge of the slot 24 as indicated at 50 to pry the shoe away from the end follower until the shoulder 42 is disengaged from the edge 46. It may be noted that the flange 44 at one end of the friction shoe is chamfered as indicated at 52 (Figure 1), thus facilitating assembly by permitting the edge of the flange to slide down the friction surface of the end follower without gouging. I may make the edge of this flange arcuate instead of chamfered for the same purpose.

It will be observed that in my novel form of friction device I have provided relatively large friction faces, both on the end followers and on the friction shoes. Also, I have so designed the parts carrying these friction surfaces that relatively heavy bodies of metal support these friction surfaces, thus permitting a substantial amount of wear to occur before the parts become inefficient.

In actual test my novel snubber has developed a friction absorbing capacity substantially greater than most comparable devices and equivalent to the friction absorbing capacity of other devices requiring much greater space.

It will readily be understood by those skilled in the art that release of the device after compression is assisted by the coil spring 2 which also serves to carry a portion of the imposed load. It may also be noted that the end followers are formed of heat treated high tensile steel, thus providing the maximum strength of the parts which retain the mechanism in assembly while, on the other hand, the friction shoes themselves are made of relatively hard cast iron, thus providing a character of surface which develops the most suitable coefficient of friction with the before mentioned cast steel and results in an exceptionally smooth friction surface without gouging.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a friction absorbing device, a coil spring, end followers having cylindrical portions received within said spring, seating means for the ends of said spring, horizontal slots in said cylindrical portions at opposite sides thereof, diagonally arranged inwardly directed cylindrical friction faces on said followers, flanges along the vertical edges of said faces, friction shoes having their opposite ends received respectively within said end followers between said flanges and having complementary friction surfaces in engagement with said faces, resilient means comprising a solid block of resilient material between said shoes, interlocking means on the ends of said shoes received in said slots, and cooperating positioning means on said shoes and on said resilient means.

2. In a friction absorbing device, a coil spring, end followers having cylindrical portions received within said spring and seating means for the ends of said spring, horizontal slots in said cylindrical portions at opposite sides thereof, diagonally arranged inwardly directed cylindrical friction faces on said followers defined by vertical flanges therealong, friction shoes having their opposite ends received respectively within said end followers and having complementary friction surfaces in engagement with said faces, said flanges affording abutment to prevent rotation of said shoes within said cylindrical portions, resilient means comprising a solid block of rubber composition material between said shoes, and means on the ends of said shoes received in said slots.

3. In a friction absorbing device, a coil spring, end followers received therein and having annular flanges in abutment therewith, said end followers having diagonally arranged cylindrical friction faces spaced apart a maximum at their inner edges and defined by shoulders at their lateral edges, friction shoes having their opposite ends received respectively within said followers and presenting complementary friction surfaces for engagement with said friction faces, said shoulders affording abutment of said shoes to prevent their rotation within said follower, resilient means comprising a solid block of rubber composition material between said shoes, and means on said shoes engaging means on said followers to retain said parts in assembled relationship.

4. In a friction absorbing device, a coil spring, end followers received therein and having annular flanges in abutment therewith, said end followers having diagonally arranged cylindrical friction faces spaced apart a maximum at their inner edges and defined by vertical shoulders along their lateral edges, friction shoes having their opposite ends received respectively within said followers and presenting complementary friction surfaces for engagement with said friction faces, said friction shoes being positioned between said shoulders and thereby prevented from rotation within said followers, and resilient means comprising a solid block of resilient material between said shoes.

5. In a friction absorbing device, a coil spring, end followers presenting inwardly directed diagonally arranged cylindrical friction faces defined by vertical shoulders along their lateral edges, slots adjacent the outer ends of said followers, friction shoes having their outer ends received within said followers, their lateral edges adjacent said shoulders, and presenting complementary friction surfaces for engagement with said faces, resilient means comprising a solid block of material between said shoes, and annular flanges on the ends of said shoes received within said slots for retaining said parts in assembled relationship.

6. In a friction absorbing device, inner and outer resilient means, friction means therebetween, said friction means comprising top and bottom followers affording seats for said outer resilient means and side shoes, said followers presenting arcuate seating means at the opposite ends of said device and presenting diagonally arranged inwardly directed cylindrical friction faces for cooperation with complementary faces on said shoes, said friction faces being defined at their lateral edges by vertical shoulders therealong, said shoulders serving as positioning means for said shoes, vertical channels between said shoulders affording space for the expansion of said inner resilient means when said device is placed under compression, and means on said shoes interlocking with shoulders on said followers to retain said parts in operative assembly.

7. In a friction absorbing device, a coil spring, end followers having cylindrical portions received within said spring and seating means for the ends of said spring, diagonally arranged inwardly directed cylindrical friction faces on said followers defined at their lateral edges by vertical shoulders therealong, friction shoes having their opposite ends received respectively within said end followers and having complementary friction surfaces in engagement with said faces, and resilient means comprising a solid block of resilient material between said shoes, said shoulders serving to prevent rotation of said shoes within said followers.

8. In a friction absorbing device, inner and outer resilient means, friction means therebetween, said friction means comprisng top and bottom followers and side shoes, said followers presenting arcuate seating means at the opposite ends of said device and presenting diagonally arranged inwardly directed cylindrical friction faces for cooperation with complementary faces on said shoes, said friction surfaces being defined at their lateral edges by vertical shoulders therealong, said shoulders defining therebetween vertical channels, said shoulders serving as positioning means for said shoes to prevent relative rotation thereof with respect to said followers, and said channels affording space for the lateral expansion of said inner resilient means when said device is placed under compression.

9. In a friction absorbing device of generally cylindrical form, inner and outer resilient means, friction means therebetween comprising end followers having seats for said outer resilient means and presenting diagonally arranged cylindrical friction faces defined by vertical shoulders along their lateral edges, vertical channels between said shoulders, and friction shoes presenting complementary friction surfaces in engagement with said friction faces, said channels affording space for the expansion of said inner resilient means when said device is placed under compression, and means on said shoes cooperating with means on said followers to retain said parts in assembly.

10. In a friction absorbing device, a coil spring, end followers, friction shoes, resilient means comprising a solid block of resilient material between said shoes for engagement therewith over a substantial portion of their length, said shoes and followers having diagonally arranged cylindrical friction faces of complementary form in engagement with each other, and vertical channels on said followers between said friction faces, said channels affording space for the expansion of said resilient means when said device is placed under compression.

11. In a friction absorbing device, a coil spring, end followers received therein and having seating means therefor, friction shoes having their opposite ends received respectively within said followers, resilient means comprising a solid block of resilient material between said friction shoes, and positioning means on said resilient means cooperating with means on said shoes and serving to retain said resilient means in position, said followers having vertical channels adjacent the vertical edges of said resilient means affording space for the expansion thereof when said device is placed under compression.

12. In a friction absorbing device, a coil spring, end followers received therein and having seating means therefor, friction shoes having their opposite ends received respectively within said followers, resilient means comprising a solid block of resilient material between said friction shoes, means on said friction shoes abutting shoulders on said followers to retain said parts in assembled relationship, and channels on said followers between said shoulders affording space for the expansion of said resilient means when said device is placed under compression.

13. In a friction absorbing device, inner and outer resilient means, and friction means therebetween, said friction means comprising top and bottom followers affording seats for said outer resilient means and side shoes, said followers presenting arcuate seating means at the opposite ends of said device and presenting diagonally arranged inwardly directed cylindrical friction faces for cooperation with complementary faces on said shoes, said friction faces being defined by vertical shoulders on said followers, said shoulders affording abutment of said shoes to prevent rotation thereof within said followers, and vertical channels between said shoulders affording space for the lateral expansion of said inner resilient means when said device is placed under compression.

14. In a friction absorbing device, a coil spring, end followers presenting diagonal cylindrical friction faces, friction shoes having complementary friction surfaces in engagement with said faces, means comprising a solid block of resilient material between said friction shoes and abutting said shoes over a substantial portion of the length thereof, cooperating means on said shoes and said resilient means to retain the latter in position, the said diagonal friction faces on said followers being defined by vertical shoulders along their vertical edges, said shoulders affording means to prevent relative rotation between said followers and said shoes.

15. In a snubber, a coil spring, end followers, friction shoes having their opposite ends engaging said followers respectively, a solid block of resilient material between said shoes, said shoes and followers having complementary diagonally arranged cylindrical friction faces in engagement with each other, and means on the opposite ends of said shoes cooperating with the respective followers to retain said parts in assembly, said faces on said followers being defined by vertical shoulders along their lateral edges, said shoulders affording positioning means for said shoes and preventing rotation within said followers.

16. In a friction absorbing device, a coil spring, end followers received therein and having seating means therefor, friction shoes having their opposite ends received respectively within said followers, a solid block of resilient material between said friction shoes, said followers having cylindrical friction faces in engagement with complementary surfaces on said shoes, and vertical channels on said followers between said friction faces affording space for the expansion of said resilient material when said device is placed under compression.

17. In a friction absorbing device, a coil spring, end followers presenting diagonal cylindrical friction faces defined by vertical shoulders along their lateral edges, vertical channels between said shoulders, friction shoes having complementary friction surfaces in engagement with said faces, a solid block of resilient material between said friction shoes and abutting said shoes over a substantial portion of the length thereof, said channels affording space for the expansion of said material when said device is placed under compression.

18. In a friction absorbing device, a coil spring, end followers, friction shoes, a solid block of resilient material between said shoes for engagement therewith over a substantial portion of their length, said shoes and followers having diagonally arranged cylindrical friction faces of complementary form in engagement with each other, said follower faces being defined by vertical shoulders along their lateral edges, and vertical channels between said shoulders, said channels affording space for the expansion of said resilient material when said device is placed under compression.

19. In a snubber, a coil spring, end followers, friction shoes having their opposite ends slidably interlocked with said followers respectively, a block of resilient material between said shoes, said shoes and followers having complementary diagonally arranged cylindrical friction faces in engagement with each other, vertical channels on said followers between said faces, said channels affording space for the expansion of said material when said device is compressed.

20. In a friction absorbing device, a coil spring, end followers received therein and having seating means therefor, friction shoes having their opposite ends received respectively within said followers, and a solid block of resilient material between said friction shoes, said followers having vertical channels aligned with the edges of said block and affording space for the expansion thereof when the device is placed under compression.

DAVID M. LIGHT.